(12) United States Patent
Lin et al.

(10) Patent No.: US 6,909,560 B2
(45) Date of Patent: Jun. 21, 2005

(54) PROJECTION LENS SHIFTING MECHANISM

(76) Inventors: Sheng-Feng Lin, No. 406, Sec. 7, Ershi Rd., ErlinJen (TW); Yao Jen Kang, No. 35, Ren-ai 1$^{st}$ St., Gueiren Shiang (TW)

( * ) Notice: Subject to any disclaimer, the term of this patent is extended or adjusted under 35 U.S.C. 154(b) by 0 days.

(21) Appl. No.: 10/686,148

(22) Filed: Oct. 15, 2003

(65) Prior Publication Data

US 2005/0083585 A1 Apr. 21, 2005

(51) Int. Cl.$^7$ .............................. G02B 7/02; G02B 15/14
(52) U.S. Cl. ....................... 359/813; 359/699; 359/694; 359/826
(58) Field of Search ................................ 359/694, 699, 359/813, 814, 819, 822, 826, 829

(56) References Cited

U.S. PATENT DOCUMENTS

| | | | | |
|---|---|---|---|---|
| 2,547,187 | A | * 4/1951 | Walker ........................ | 359/699 |
| 5,847,885 | A | * 12/1998 | Arnone et al. .............. | 359/818 |
| 5,953,164 | A | * 9/1999 | Arnone et al. .............. | 359/818 |
| 5,986,826 | A | * 11/1999 | Kosaka et al. .............. | 359/814 |
| 5,999,346 | A | * 12/1999 | Grundstrom et al. ....... | 359/822 |
| 6,005,723 | A | * 12/1999 | Kosaka et al. .............. | 359/822 |
| 6,118,600 | A | * 9/2000 | Chang ........................ | 359/821 |
| 2002/0154278 | A1 | 10/2002 | Masuda | |

FOREIGN PATENT DOCUMENTS

| | | |
|---|---|---|
| JP | 05-196888 | 6/1993 |
| JP | 05-249409 | 9/1993 |
| JP | 09-138377 | 5/1997 |
| JP | 2000-333103 | 11/2000 |

* cited by examiner

*Primary Examiner*—Ricky Mack
(74) *Attorney, Agent, or Firm*—Senniger Powers

(57) ABSTRACT

The present invention relates to a projection lens shifting mechanism having: a driving apparatus, a first supporting apparatus, a transmitting apparatus, a movable plate and a second supporting apparatus. The transmitting apparatus is driven by the driving apparatus for changing a direction of the torque transmitted by the driving apparatus. The movable plate, on which a projection lens is mounted, is in contact with the transmitting apparatus to be driven by the transmitting apparatus to translate in a perpendicular direction with respect to the central axis of the driving apparatus, whereby providing a user-friendly interface, that is, when it is operated manually, a direction that the user applies force against the driving apparatus is consistent with that the movable plate translates. Furthermore, after two above mechanisms are combined, the projection lens can be positioned in any position of a two-dimensional plane.

25 Claims, 6 Drawing Sheets

PROJECTION LENS SHIFTING MECHANISM

BACKGROUND OF THE INVENTION

1. Field of the Invention

The present invention relates to a projection lens shifting mechanism, and more particularly a projection lens shifting mechanism that enables two-dimensional adjustment of a projection lens.

2. Description of the Related Art

Conventionally, the projection lens of a projector is fixed, and the position of the picture projected onto the screen is therefore determined by the relative position or angle of the screen and projector. In order to project a picture of proper position onto the screen, the projector must be adjusted to the proper relative position with respect to the screen, and considerable time and effort are therefore required to position the projector.

When the projector is set up, and it is desired to shift the position of the picture on the screen still higher, the projection direction is shifted upward by means of a height adjustment mechanism attached to the forward legs of the projector. In such a case, however, since the angle between the projection lens and the screen surface changes, the picture that should be projected, for example, as a square is distorted to a trapezoid.

To solve this problem, a type of projection lens shifting mechanism as shown in FIG. 1 has been developed. The position of the picture on the screen can be shifted by said projection lens shifting mechanism 1 when the projector is set up.

The projection lens shifting mechanism 1 comprises: a driving wheel 11, a worm 12, two fixed bars 13,14, four pedestals 151,152,153,154 and a movable plate 16. The four pedestals 151,152,153,154 are secured on a base plate 17, and form a plane parallel to the surface of the light valve of the projector (not shown in the figure). The first fixed bar 13 is secured to the pedestals 151,152, whereas the second fixed bar 14 is secured to the pedestals 153,154. Worm 12 is attached to one end of driving wheel 11, and they have the same central axis and are joined to the first fixed bar 13; therefore, they can rotate with respect to the first fixed bar 13.

Movable plate 16, on which a projection lens 18 is mounted, has a gear rack 161 and a U-shaped jaw 162 on one side, and two sleeves 163,164 on the other side, wherein the gear rack 161 engages with the worm 1, the U-shaped jaw 162 slidably clamps the first fixed bar 13, and two sleeves 163,164 are slidably joined to the second fixed bar 14.

When driving wheel 11 rotates due to an external torque, worm 12 rotates accordingly. Then, worm 12 drives the gear rack 161 so as to make movable plate 16 translate in the vertical direction. U-shaped jaw 162 and two sleeves 163, 164 can restrict the direction of translation of movable plate 16.

When the projection lens shifting mechanism 1 is operated manually, the user applies force against the driving wheel 11 in the horizontal direction, but the movable plate 16 translates in the vertical direction. Such interface is not user friendly. In addition, said shifting mechanism only provides one-dimensional movement, which cannot achieve two-dimensional movement. Furthermore, the engagement of worm 12 and gear rack 161 cannot provide high resolution positioning.

Consequently, there is a need for a novel and improved projection lens shifting mechanism to solve above-mentioned problem.

SUMMARY OF THE INVENTION

The object of the present invention is to provide a projection lens shifting mechanism with a user-friendly interface, that is, when it is operated manually, the direction that the user applies force against the driving wheel is consistent with those of the translation of movable plate.

Another object of the present invention is to provide a projection lens shifting mechanism with two-dimensional independent adjusting mechanism that can adjust the projection lens to any position in a two-dimensional plane parallel to the surface of light valve.

Another object of the present invention is to provide a projection lens shifting mechanism comprising: a driving apparatus (for example, a driving wheel), a first supporting apparatus, a transmitting apparatus, a movable plate, and a second supporting apparatus. The driving wheel has a central axis and rotates when an external force is applied thereon. The first supporting apparatus is secured on a base plate for supporting the driving apparatus. The transmitting apparatus is driven by the driving apparatus for changing the direction of the torque transmitted by the driving apparatus. The movable plate, on which a projection lens is mounted, is in contact with the transmitting apparatus to be driven by the transmitting apparatus to translate in a perpendicular direction with respect to the central axis of the driving apparatus. The second supporting apparatus is secured on the base plate for supporting the movable plate and restricting the direction of the translation of the movable plate.

The transmitting apparatus comprises: a worm, a supporting bar and a transmitting wheel. The worm is driven by the driving wheel. The supporting bar is secured on base plate and is perpendicular to the surface of the base plate. The transmitting wheel is joined to the supporting bar, which has a plurality of gear teeth in an area contacting with the worm to engage with the worm and has a cam in an contact area contacting with the movable plate to push the movable plate.

Another object of the present invention is to provide a projection lens shifting mechanism that enables two-dimensional adjustment, which comprises:

a first driving apparatus having a central axis and receiving an external torque;

a first supporting apparatus secured on a base plate for supporting said first driving apparatus;

a first transmitting apparatus driven by said first driving apparatus for changing the direction of the torque transmitted by said first driving apparatus;

a first movable plate being in contact with said first transmitting apparatus to be driven by said first transmitting apparatus to translate in a perpendicular direction with respect to said central axis of said first driving apparatus;

a second supporting apparatus secured on said base plate for supporting said first movable plate and restricting the direction of the translation of said first movable plate;

a second driving apparatus having a central axis perpendicular to the central axis of said first driving wheel;

a third supporting apparatus secured on a base plate for supporting said second driving apparatus;

a second transmitting apparatus driven by said second driving apparatus for changing the direction of the torque transmitted by said second driving apparatus;

a second movable plate, on which a projection lens is mounted, being above said first movable plate, said second movable plate being in contact with said second transmitting apparatus to be driven by said second transmitting apparatus to translate in a perpendicular direction with respect to said central axis of said second driving apparatus; and a fourth supporting apparatus secured on said first movable plate for supporting said second movable plate and restricting the direction of the translation of said second movable plate.

DETAILED DESCRIPTION OF THE INVENTION

Figure 1:
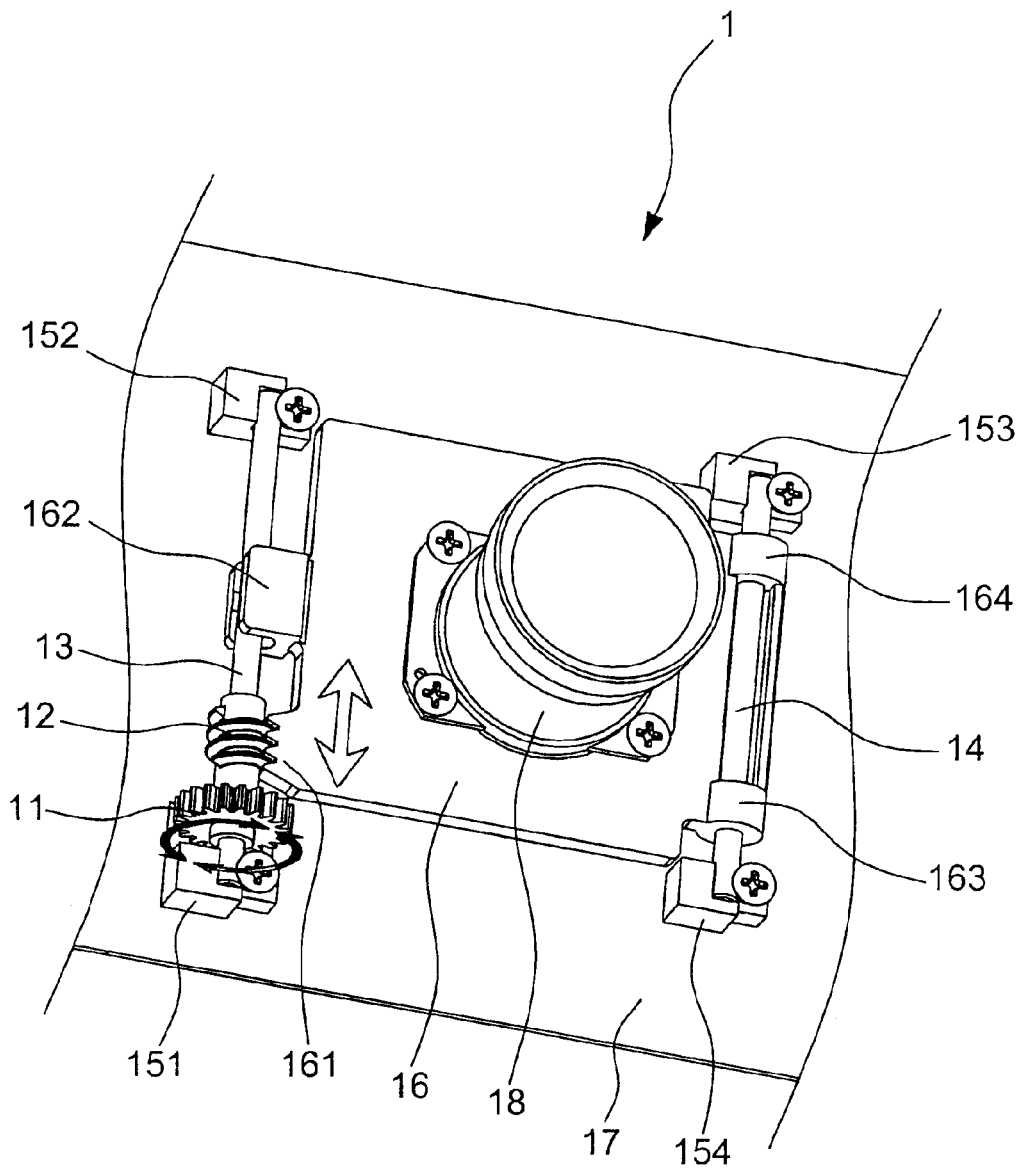
FIG. 1 shows a perspective view of the projection lens shifting mechanism of the prior art.
Figure 2:
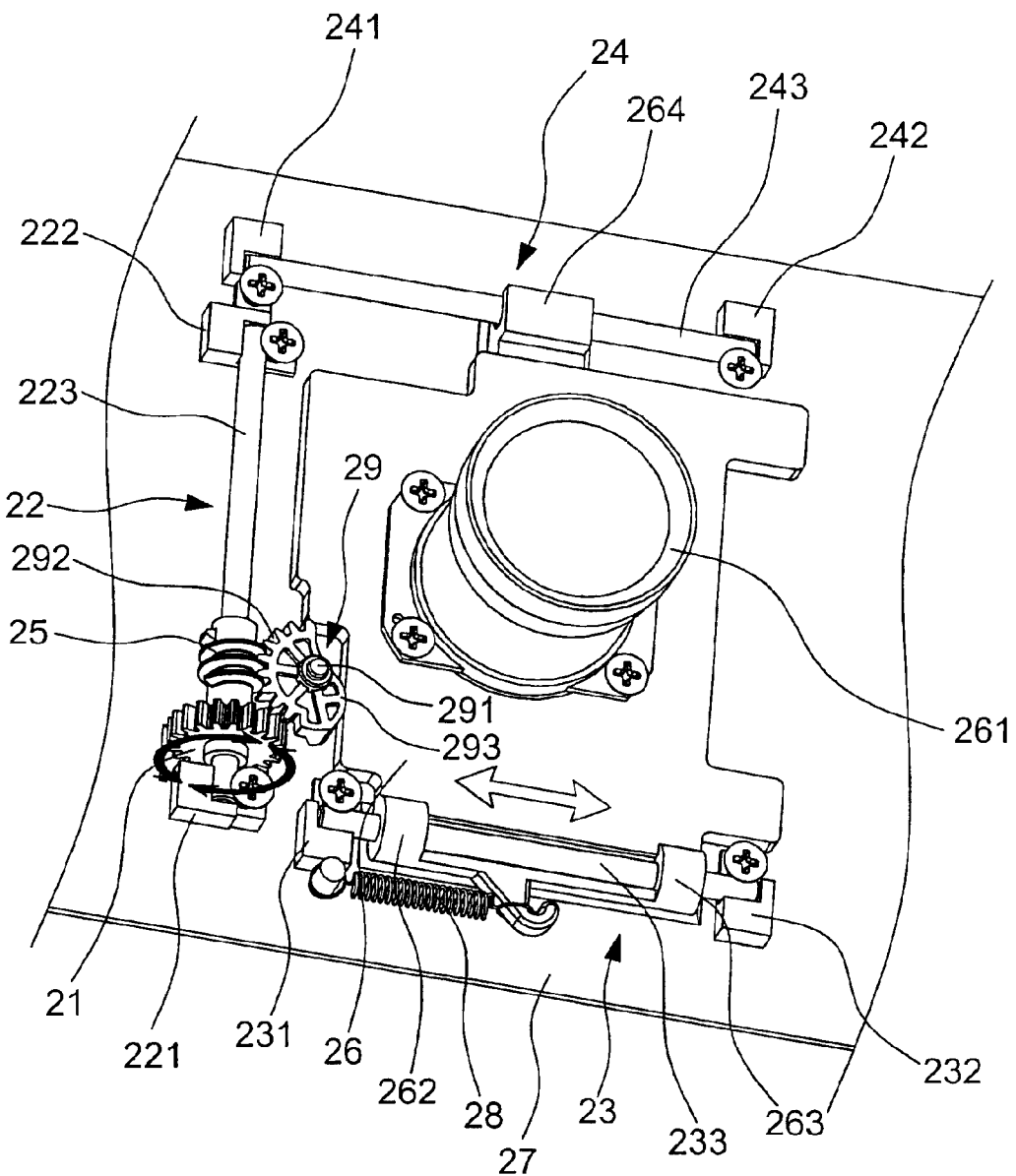
FIG. 2 shows a perspective view of the projection lens shifting mechanism according to the first embodiment of the present invention.

Referring to FIG. 2, a perspective view of the projection lens shifting mechanism according to the first embodiment of the present invention is shown. The projection lens shifting mechanism 2 comprises: a driving apparatus (for example, a driving wheel 21), a first supporting apparatus 22, a transmitting apparatus, a movable plate 26, a second supporting apparatus 23, a third supporting apparatus 24 and an elastic member 28.

The driving wheel 21 has a central axis that is parallel to the surface of base plate 27, and rotates when an external force is applied thereon.

The first supporting apparatus 22 comprises two pedestals 221, 222 and a fixed bar 223. The pedestals 221, 222 are secured on base plate 27. The fixed bar 223 is secured to the pedestals 221, 222, so that the central axis of the fixed bar 223 is parallel to the surface of base plate 27 and the light valve of the projector.

The transmitting apparatus is driven by said driving wheel 21 for changing the direction of the torque transmitted by said driving wheel 21. The transmitting apparatus comprises: a worm 25, a supporting bar 291 and a transmitting wheel 29. Worm 25 is driven by driving wheel 21. In this embodiment, worm 25 is attached to one end of driving wheel 21, and they have the same central axis and are joined to the fixed bar 223, and they therefore can rotate with respect to the fixed bar 223. Alternatively, worm 25 can be driven by driving wheel 21 in any well-known way, and they may not join to the same fixed bar.

The supporting bar 291 is secured on base plate 27 and is perpendicular to the surface of said base plate 27. The transmitting wheel 29 is joined to supporting bar 291, and can be divided into two parts, one of which has a plurality of gear teeth 292 in an area contacting with the worm 25 to engage with the worm 25 and another part has a cam 293 in an area contacting with the movable plate 26 to push the movable plate 26.

The second supporting apparatus 23 comprises two pedestals 231, 232 and a fixed bar 233. The pedestals 231, 232 are secured on base plate 27. The fixed bar 233 is secured to the pedestals 231, 232, so that the central axis of the fixed bar 233 is parallel to the surface of base plate 27 and the light valve of the projector.

The third supporting apparatus 24 comprises two pedestals 241, 242 and a fixed bar 243. The pedestals 241, 242 are secured on base plate 27. The fixed bar 243 is secured to the pedestals 241, 242, so that the central axis of the fixed bar 243 is parallel to the surface of base plate 27 and the light valve of the projector.

The movable plate 26, on which a projection lens 261 is mounted, is in contact with the cam 293 on one side thereof so as to be pushed by the cam 293. The movable plate 26 has two sleeves 262,263 on the other side, and the two sleeves 262,263 are slidably joined to the fixed bar 233 for restricting the direction of translation of movable plate 26. Furthermore, movable plate 26 has a U-shaped jaw 264 on the other side, and the U-shaped jaw 264 slidably clamps the fixed bar 243 so as to make the movable plate 26 translate steadily. The trace of the projection lens 261 is parallel to the surface of the light valve of the projector.

One end of elastic member 28 is secured to base plate 27 and the other end is secured to movable plate 26 so as to eliminate the clearance between the elements of said transmitting apparatus, and between the cam 293 and the movable plate 26. The elastic member 28 can also provide a recovery force for the reciprocation of the movable plate 26. In this embodiment, the elastic member 28 is a spring.

When the user applies force against the driving wheel 21 in the horizontal direction to rotate the driving wheel 21, the worm 25 rotates accordingly, and then the worm 25 drives the gear teeth 292 of the transmitting wheel 29 to rotate transmitting wheel 29; then, the cam 293 of the transmitting wheel 29 pushes the movable plate 26 to translate in the horizontal direction by normal force, thereby providing a user-friendly interface, i.e. when it is operated manually, the direction in which the user applies force against the driving wheel 21 is consistent with that of translation of movable plate 26.

Figure 3:
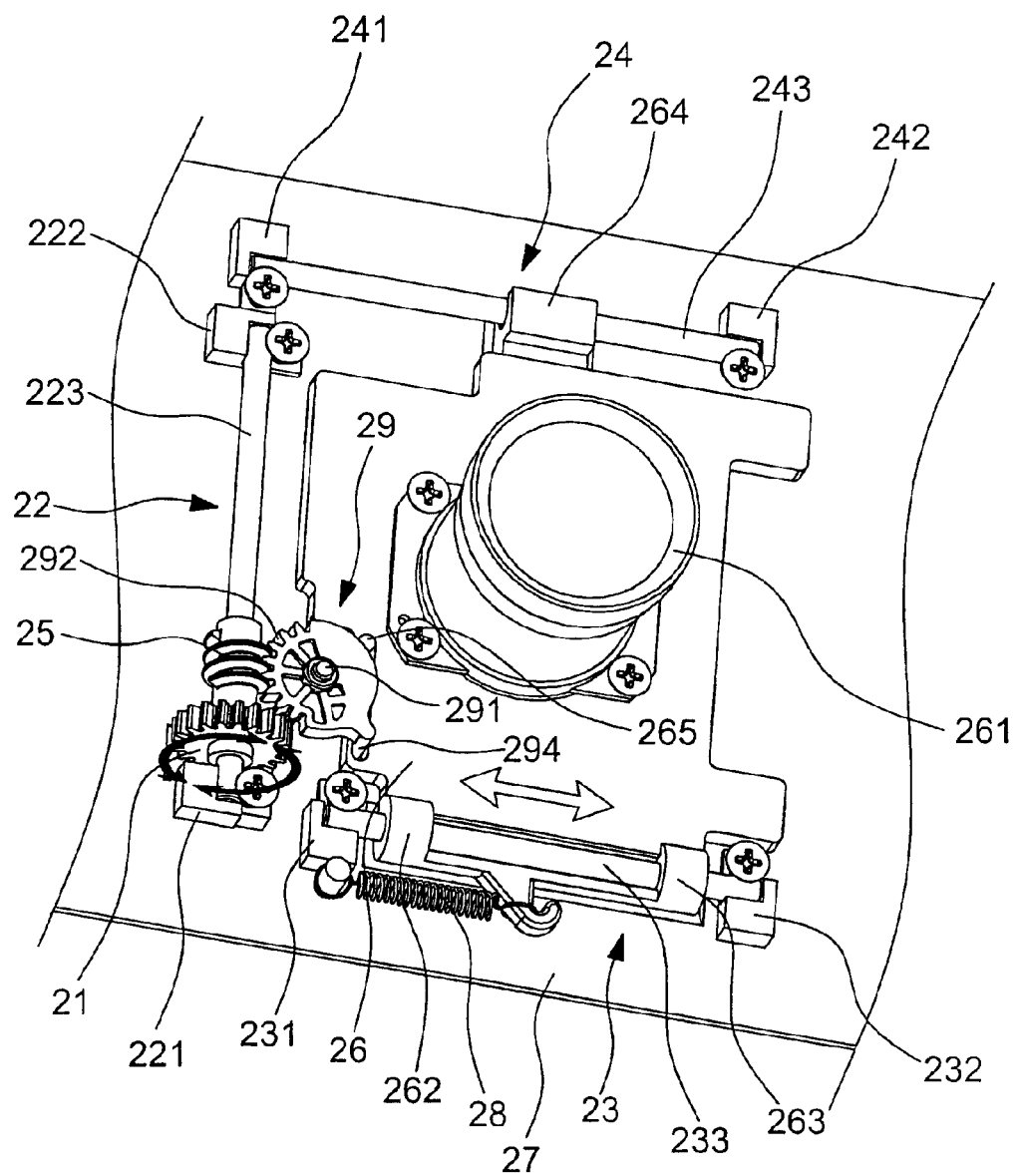
FIG. 3 shows a perspective view of the projection lens shifting mechanism according to the second embodiment of the present invention.

Referring to FIG. 3, a perspective view of the projection lens shifting mechanism according to the second embodiment of the present invention is shown. All elements of the second embodiment are equivalent to those of the previously described first embodiment except the transmitting wheel 29 of the transmitting apparatus and movable plate 26. The transmitting wheel 29 of this embodiment still has two parts, one of which has a plurality of gear teeth to engage with the worm (the same with the first embodiment) and the other part has a rod 294 placed in a guide slot 265 of the movable plate 26 so as to push the movable plate 26.

Figure 4:
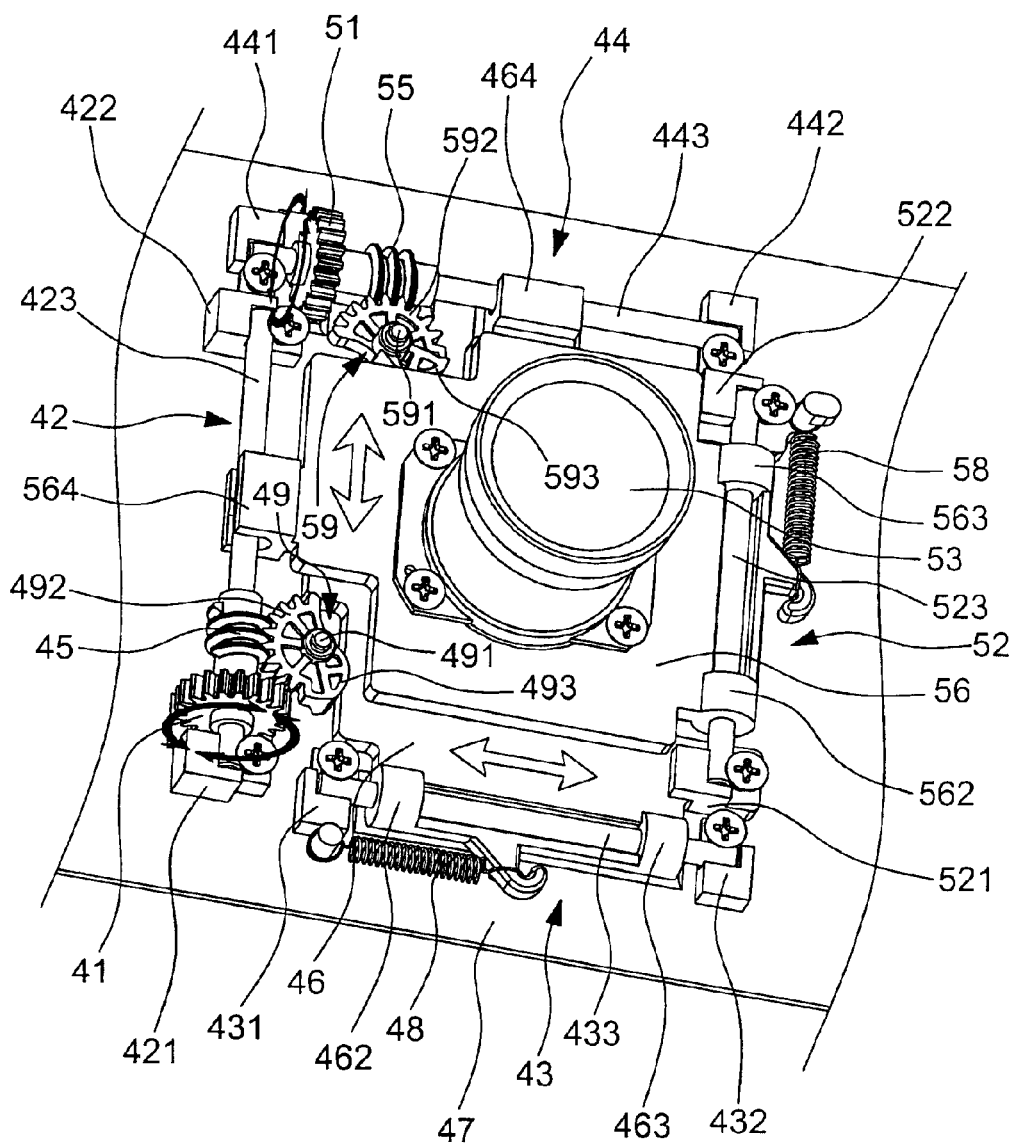
FIG. 4 shows a perspective view of the projection lens shifting mechanism according to the third embodiment of the present invention.

Referring to FIG. 4, a perspective view of the projection lens shifting mechanism according to the third embodiment of the present invention is shown. This embodiment is a combination of two projection lens shifting mechanisms of FIG. 2. The projection lens shifting mechanism 4 of this embodiment comprises: a first driving apparatus (for example, a first driving wheel 41), a first supporting apparatus 42, a first transmitting apparatus, a first movable plate 46, a second supporting apparatus 43, a second driving apparatus (for example, a second driving wheel 51), a third supporting apparatus 44, a second transmitting apparatus, a second movable plate 56 that is above the first movable plate 46, a fourth supporting apparatus 52, a first elastic member 48 and a second elastic member 58.

The first driving wheel 41 has a central axis that is parallel to the surface of base plate 47, and rotates when an external force is applied thereon.

The first supporting apparatus 42 comprises two pedestals 421, 422 and a fixed bar 423. The pedestals 421, 422 are secured on base plate 47. The fixed bar 423 is secured to the pedestals 421, 422, so that the central axis of the fixed bar 423 is parallel to the surface of base plate 47 and the light valve of the projector.

The first transmitting apparatus comprises: a worm 45, a supporting bar 491 and a transmitting wheel 49. Worm 45 is driven by driving wheel 41. In this embodiment, worm 45 is attached to one end of driving wheel 41, and they have the same central axis and are joined to the fixed bar 423, and they therefore can rotate with respect to the fixed bar 423. Alternatively, worm 45 can be driven by driving wheel 41 in any well-known way, and they may not join to the same fixed bar.

The supporting bar 491 is secured on base plate 47 and is perpendicular to the surface of said base plate 47. The transmitting wheel 49 is joined to supporting bar 491, and can be divided into two parts, one of which has a plurality of gear teeth 492 in an area contacting with the worm 45 to engage with the worm 45 and another part has a cam 493 in an area contacting with the movable plate 46 to push the movable plate 46.

The second supporting apparatus 43 comprises two pedestals 431, 432 and a fixed bar 433. The pedestals 431, 432 are secured on base plate 47. The fixed bar 433 is secured to the pedestals 431, 432, so that the central axis of the fixed bar 433 is parallel to the surface of base plate 47 and the light valve of the projector.

The third supporting apparatus 44 comprises two pedestals 441, 442 and a fixed bar 443. The pedestals 441, 442 are secured on base plate 47. The fixed bar 443 is secured to the pedestals 441, 442, so that the central axis of the fixed bar 443 is parallel to the surface of base plate 47 and the light valve of the projector.

The first movable plate 46 has a through hole (not shown in the figure) at a center portion for the passage of the bottom of the projection lens 53, and contacts with the cam 493 on one side thereof so as to be pushed by the cam 493. The first movable plate 46 has two sleeves 462,463 on the other side, and the two sleeves 462,463 are slidably joined to the fixed bar 433 for restricting the direction of translation of the first movable plate 46. Furthermore, the first movable plate 46 has a U-shaped jaw 464 on the other side, and the U-shaped jaw 464 slidably clamps the fixed bar 443 so as to make the first movable plate 46 translate steadily.

One end of the first elastic member 48 is secured to base plate 47 and the other end is secured to the first movable plate 46 so as to eliminate the clearance between the elements of said first transmitting apparatus, and between the cam 493 and the first movable plate 46. The first elastic member 48 can also provide a recovery force for the reciprocation of the first movable plate 46. In this embodiment, the elastic member 48 is a spring.

The second driving wheel 51 has a central axis that is parallel to the surface of base plate 47 and is perpendicular to the central axis of the first driving wheel 41, and rotates when an external force is applied thereon.

The fourth supporting apparatus 52 comprises two pedestals 521, 522 and a fixed bar 523. The pedestals 521, 522 are secured on the first movable plate 46. The fixed bar 523 is secured to the pedestals 521, 522. The central axis of the fixed bar 523 is parallel to the surface of base plate 47 and the light valve of the projector.

The second transmitting apparatus comprises: a worm 55, a supporting bar 591 and a transmitting wheel 59. Worm 55 is driven by driving wheel 51. In this embodiment, worm 55 is attached to one end of driving wheel 51, and they have the same central axis and are joined to the fixed bar 523, and they therefore can rotate with respect to the fixed bar 523. Alternatively, worm 55 can be driven by driving wheel 51 in any well-known way, and they may not join to the same fixed bar.

The supporting bar 591 is secured on base plate 47 and is perpendicular to the surface of said base plate 47. The transmitting wheel 59 is joined to supporting bar 591, and can be divided into two parts, one of which has a plurality of gear teeth 592 in an area contacting with the worm 55 to engage with the worm 55 and another part has a cam 593 in an area contacting with the movable plate 56 to push the movable plate 56.

The second movable plate 56, on which a projection lens 53 is mounted, is in contact with the cam 593 on one side thereof so as to be pushed by the cam 593. The second movable plate 56 has two sleeves 562,563 on the other side, and the two sleeves 562,563 are slidably joined to the fixed bar 523 for restricting the direction of translation of the second movable plate 56. Furthermore, the second movable plate 56 has a U-shaped jaw 564 on the other side, and the U-shaped jaw 564 slidably clamps the fixed bar 423 so as to make the second movable plate 56 translate steadily. The trace of the projection lens 53 is parallel to the surface of the light valve of the projector.

One end of the second elastic member 58 is secured to the first movable plate 46 and the other end is secured to the second movable plate 56 so as to eliminate the clearance between the elements of said second transmitting apparatus, and between the cam 593 and the second movable plate 56. The second elastic member 58 can also provide a recovery force for the reciprocation of the second movable plate 56. In this embodiment, the elastic member 58 is a spring.

When the user applies force against the first driving wheel 41 in the horizontal direction to rotate the first driving wheel 41, the worm 45 and transmitting wheel 49 rotates accordingly, and then the cam 493 of the transmitting wheel 49 pushes the first movable plate 46 to translate in the horizontal direction. When the user applies force against the second driving wheel 51 in the vertical direction to rotate the second driving wheel 51, the worm 55 and transmitting wheel 59 rotates accordingly, and then the cam 593 of the transmitting wheel 59 pushes the second movable plate 56 to translate in the vertical direction. Therefore, the projection lens 53 can be positioned in any position of a two-dimensional plane.

Figure 5:
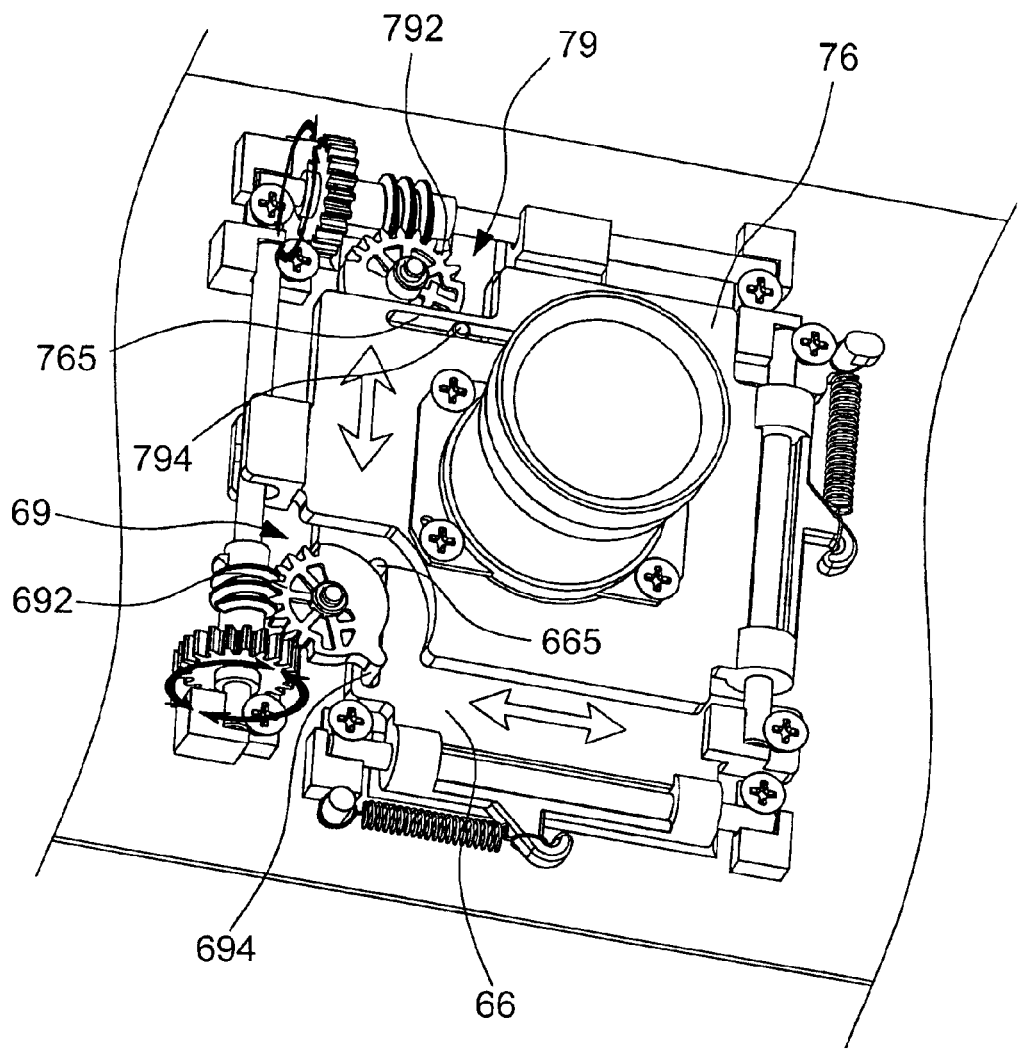
FIG. 5 shows a perspective view of the projection lens shifting mechanism according to the fourth embodiment of the present invention.

Referring to FIG. 5, a perspective view of the projection lens shifting mechanism according to the fourth embodiment of the present invention is shown. All elements of the fourth embodiment are equivalent to that of previously described third embodiment except the transmitting wheels 69, 79 of the transmitting apparatus and movable plates 66, 76. Each of the transmitting wheels 69, 79 of this embodiment still has two parts, one of which has a plurality of gear teeth to engage with the worm (the same with the third embodiment). The transmitting wheel 69 has a rod 694 at the portion nearby the movable plate 66, and the rod 694 is placed in a guide slot 665 of the movable plate 66 so as to push the movable plate 66. The transmitting wheel 79 has a rod 794 at the portion near by the movable plate 76, and the rod 794 is placed in a guide slot 765 of the movable plate 76 so as to push the movable plate 76.

Figure 6:
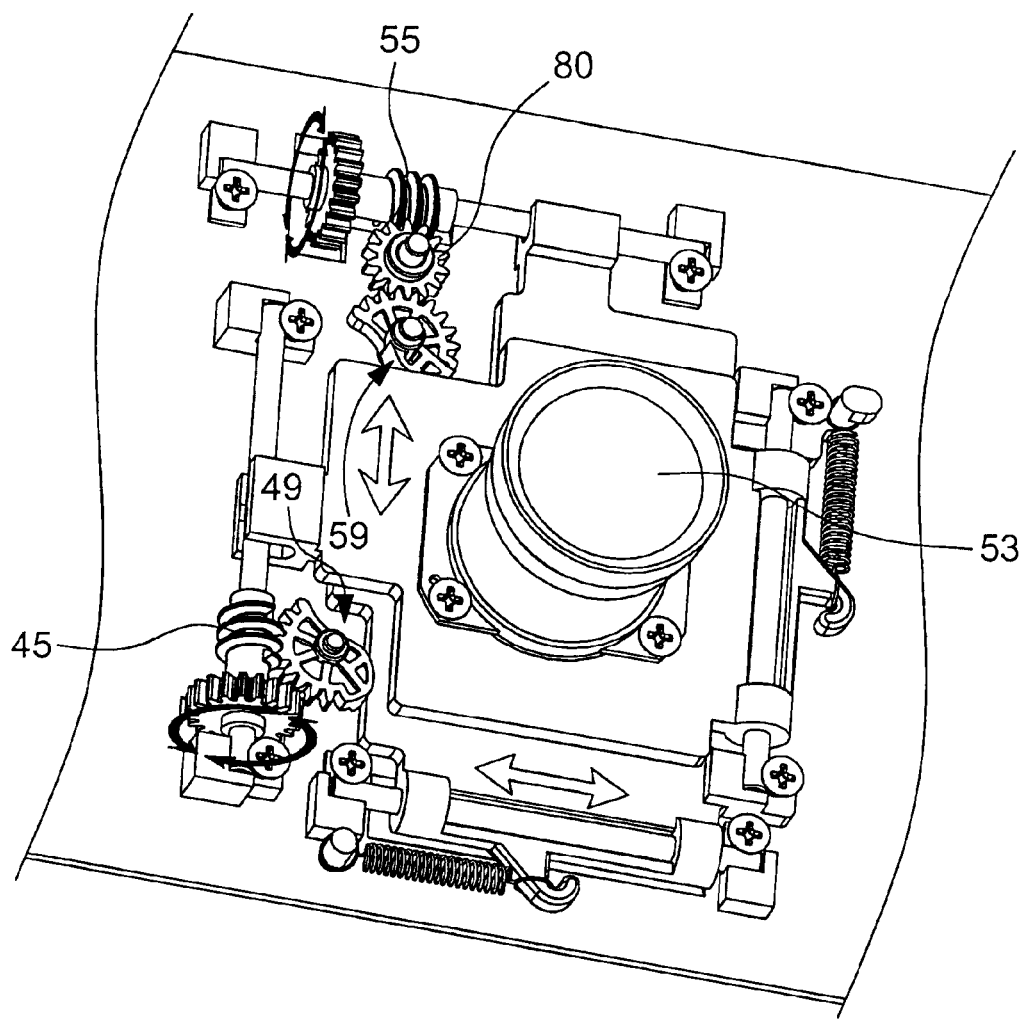
FIG. 6 shows a perspective view of the projection lens shifting mechanism according to the fifth embodiment of the present invention.

Referring to FIG. 6, a perspective view of the projection lens shifting mechanism according to the fifth embodiment of the present invention is shown. All elements of this embodiment are equivalent to those of the previously described third embodiment except that a reduction pinion 80 is added. The reduction pinion 80 is disposed between the worm 55 and the transmitting wheel 59 to perform a predetermined reduction ratio, so as to raise the positioning resolution of the projection lens 53. In other application, a reduction pinion may be disposed between the worm 45 and the transmitting wheel 49, or a reduction pinion set that comprises a plurality of reduction pinions may replace the reduction pinion to perform a higher positioning resolution.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications which maintain the spirit and scope of this invention are within the scope as defined in the appended claims.

What is claimed is:

1. A projection lens shifting mechanism comprising:
   a driving wheel, having a central axis and for receiving an external torque;
   a worm, driven by said driving wheel;
   a transmitting wheel, having a plurality of gear teeth engaging with said worm for changing a direction of the torque transmitted by said driving wheel; and
   a movable plate, on which a projection lens is mounted, being in contact with said transmitting wheel to be driven by said transmitting wheel to translate in a perpendicular direction with respect to said central axis of said driving wheel.

2. The projection lens shifting mechanism claimed in claim 1, further comprising at least one reduction pinion disposed between said worm and said transmitting wheel.

3. A projection lens shifting mechanism comprising:
   a first driving apparatus having a central axis and receiving an external torque;
   a first supporting apparatus secured on a base plate for supporting said first driving apparatus;
   a first transmitting apparatus driven by said first driving apparatus for changing a direction of the torque transmitted by said first driving apparatus;
   a first movable plate being in contact with said first transmitting apparatus to be driven by said first transmitting apparatus to translate in a perpendicular direction with respect to said central axis of said first driving apparatus;
   a second supporting apparatus secured on said base plate for supporting said first movable plate and restricting a direction that said first movable plate translates;
   a second driving apparatus having a central axis perpendicular to the central axis of said first driving wheel;
   a third supporting apparatus secured on a base plate for supporting said second driving apparatus;
   a second transmitting apparatus driven by said second driving apparatus for changing a direction of the torque transmitted by said second driving apparatus;
   a second movable plate, on which a projection lens is mounted, being above said first movable plate, said second movable plate being in contact with said second transmitting apparatus to be driven by said second transmitting apparatus to translate in a perpendicular direction with respect to said central axis of said second driving apparatus; and
   a fourth supporting apparatus secured on said first movable plate for supporting said second movable plate and restricting a direction that said second movable plate translates.

4. The projection lens shifting mechanism claimed in claim 3, wherein said first transmitting apparatus comprises:
   a worm driven by said first driving apparatus;
   a supporting bar secured on said base plate and being perpendicular to said base plate; and
   a transmitting wheel joined to said supporting bar, said transmitting wheel having a plurality of gear teeth engaging with said worm, said transmitting wheel having a cam in an area contacting with said first movable plate to push said first movable plate.

5. The projection lens shifting mechanism claimed in claim 3, wherein said first movable plate further comprises a guide slot, and said first transmitting apparatus comprises:
   a worm driven by said first driving apparatus;
   a supporting bar secured on said base plate and being perpendicular to said base plate; and
   a transmitting wheel joined to said supporting bar, said transmitting wheel having a plurality of gear teeth engaging with said worm, said transmitting wheel having a rod placed in said guide slot to push said first movable plate.

6. The projection lens shifting mechanism claimed in claim 4, further comprising at least one reduction pinion disposed between said worm and said transmitting wheel.

7. The projection lens shifting mechanism claimed in claim 4, wherein said first supporting apparatus comprises two pedestals and a fixed bar, said two pedestals are secured on said base plate, said fixed bar is secured on said two pedestals, and said worm and said transmitting wheel are joined to said fixed bar.

8. The projection lens shifting mechanism claimed in claim 3, wherein said second supporting apparatus comprises two pedestals and a fixed bar, said two pedestals are secured on said base plate, said fixed bar is secured on said two pedestals, and said worm and said transmitting wheel are joined to said fixed bar.

9. The projection lens shifting mechanism claimed in claim 8, wherein said first movable plate further comprises two sleeves that are slidably joined to said fixed bar.

10. The projection lens shifting mechanism claimed in claim 3, further comprising a first elastic member having one end secured to said base plate and the other end secured to said first movable plate.

11. The projection lens shifting mechanism claimed in claim 10, wherein said first elastic member is a spring.

12. The projection lens shifting mechanism claimed in claim 3, wherein said third supporting apparatus comprises two pedestals and a fixed bar, said two pedestals are secured on said base plate, said fixed bar is secured on said two pedestals.

13. The projection lens shifting mechanism claimed in claim 12, wherein said first movable plate further comprises a U-shaped jaw that slidably clamps said fixed bar.

14. The projection lens shifting mechanism claimed in claim 3, wherein said fourth supporting apparatus comprises two pedestals and a fixed bar, said two pedestals are secured on said base plate, said fixed bar is secured on said two pedestals.

15. The projection lens shifting mechanism claimed in claim 14, wherein said first movable plate further comprises a U-shaped jaw that slidably clamps said fixed bar.

16. The projection lens shifting mechanism claimed in claim 3, wherein said second transmitting apparatus comprises:
   a worm driven by said second driving apparatus;
   a supporting bar secured on said base plate and being perpendicular to said base plate; and
   a transmitting wheel joined to said supporting bar, said transmitting wheel having a plurality of gear teeth engaging with said worm, said transmitting wheel having a cam in an area contacting with said second movable plate to push said second movable plate.

17. The projection lens shifting mechanism claimed in claim 3, wherein said second movable plate further comprises a guide slot, and said second transmitting apparatus comprises:
   a worm driven by said second driving apparatus;
   a supporting bar secured on said base plate and being perpendicular to said base plate; and
   a transmitting wheel joined to said supporting bar, said transmitting wheel having a plurality of gear teeth engaging with said worm, said transmitting wheel having a rod placed in said guide slot to push said first movable plate.

18. The projection lens shifting mechanism claimed in claim 16, further comprising at least one reduction pinion disposed between said worm and said transmitting wheel.

19. The projection lens shifting mechanism claimed in claim 16, wherein said third supporting apparatus comprises two pedestals and a fixed bar, said two pedestals are secured on said base plate, said fixed bar is secured on said two pedestals, and said worm and said transmitting wheel are joined to said fixed bar.

20. The projection lens shifting mechanism claimed in claim 19, wherein said second movable plate further comprises a U-shaped jaw that slidably clamps said fixed bar.

21. The projection lens shifting mechanism claimed in claim 3, further comprising a second elastic member having one end secured to said first movable plate and the other end secured to said second movable plate.

22. The projection lens shifting mechanism claimed in claim 21, wherein said second elastic member is a spring.

23. A projection lens shifting mechanism comprising:
   a first driving apparatus, having a central axis and for receiving an external torque;
   a first worm, driven by said first driving apparatus;
   a first transmitting wheel, having a plurality of gear teeth engaging with said first worm for changing a direction of the torque transmitted by said first driving apparatus;
   a first movable plate, being in contact with said first transmitting wheel to be driven by said first transmitting wheel to translate in a perpendicular direction with respect to said central axis of said first driving apparatus;
   a second driving apparatus, having a central axis perpendicular to the central axis of said first driving wheel;
   a second worm, driven by said second driving apparatus;
   a second transmitting wheel, having a plurality of gear teeth engaging with said second worm for changing a direction of the torque transmitted by said second driving apparatus; and
   a second movable plate, on which a projection lens is mounted, being above said first movable plate, said second movable plate being in contact with said second transmitting apparatus to be driven by said second transmitting apparatus to translate in a perpendicular direction with respect to said central axis of said second driving apparatus.

24. The projection lens shifting mechanism claimed in claim 23, further comprising at least one reduction pinion disposed between said first worm and said first transmitting wheel.

25. The projection lens shifting mechanism claimed in claim 23, further comprising at least one reduction pinion disposed between said second worm and said second transmitting wheel.

* * * * *